US007140036B2

(12) United States Patent
Bhagavatula et al.

(10) Patent No.: US 7,140,036 B2
(45) Date of Patent: Nov. 21, 2006

(54) CENTRALIZED IDENTITY AUTHENTICATION FOR ELECTRONIC COMMUNICATION NETWORKS

(75) Inventors: Ravishankar S. Bhagavatula, Yorba Linda, CA (US); Chandra S. Balasubramanian, Mentor-on-the-Lake, OH (US); Francis M. Sherwin, Cleveland Heights, OH (US); Michael A. Keresman, III, Kirtland Hills, OH (US); Jeffry J. Bowman, Willoughby Hills, OH (US)

(73) Assignee: CardinalCommerce Corporation, Mentor, OH (US)

( * ) Notice: Subject to any disclaimer, the term of this patent is extended or adjusted under 35 U.S.C. 154(b) by 532 days.

(21) Appl. No.: 09/798,830

(22) Filed: Mar. 2, 2001

(65) Prior Publication Data

US 2001/0037451 A1 Nov. 1, 2001

Related U.S. Application Data

(60) Provisional application No. 60/187,272, filed on Mar. 6, 2000, provisional application No. 60/187,341, filed on Mar. 6, 2000, provisional application No. 60/187,271, filed on Mar. 6, 2000.

(51) Int. Cl.
  *H04L 9/32* (2006.01)
(52) U.S. Cl. .................................. 726/2; 726/3; 726/4
(58) Field of Classification Search ................ 713/182, 713/183, 150, 155, 168–170, 200–202; 709/200, 709/206, 224, 225, 226, 220, 203, 221, 223; 705/26, 27, 53, 57, 50, 67–68, 70, 75–79; 710/36, 9; 380/30, 270; 726/2–9
See application file for complete search history.

(56) References Cited

U.S. PATENT DOCUMENTS 3,806,874 A 4/1974 Ehrat (Continued)

FOREIGN PATENT DOCUMENTS

EP 0 668 579 A2 8/1995

(Continued)

OTHER PUBLICATIONS

Burk, et al., "Value Exchange Systems Enabling Security and Unobservability," Computers & Security, Elsevier Science Publishers, Amsterdam, NL. vol. 9, No. 8, Dec. 1, 1990, pp. 715-721.

(Continued)

*Primary Examiner*—Hosuk Song
(74) *Attorney, Agent, or Firm*—Fay, Sharpe, Fagan, Minnich & McKee, LLP

(57) ABSTRACT

A method of centralized identity authentication for use in connection with a communications network includes registering users of the communications network such that each registered user's identity is uniquely defined and determinable, and registering a plurality of vendors having a presence on the communications network. The registered vendors selectively transact with registered users, wherein the transactions include: (i) the registered vendor selling goods and/or services to the registered user; (ii) the registered vendor granting the registered user access to personal records maintained by the registered vendor; and/or (iii) the registered vendor communicating to the registered user personal information maintained by the registered vendor. The method also includes each user's identity being authenticated over the communications network prior to completion of transactions between registered vendors and registered users.

15 Claims, 6 Drawing Sheets

U.S. PATENT DOCUMENTS

| | | | |
|---|---|---|---|
| 4,720,860 A | 1/1988 | Weiss | |
| 4,747,050 A | 5/1988 | Brachtl et al. | |
| 4,799,156 A | 1/1989 | Shavit et al. | |
| 4,800,590 A | 1/1989 | Vaughan | |
| 4,885,778 A | 12/1989 | Weiss | |
| 5,168,520 A | 12/1992 | Weiss | |
| 5,222,018 A * | 6/1993 | Sharpe et al. | 705/30 |
| 5,233,655 A | 8/1993 | Shapiro | |
| 5,237,614 A | 8/1993 | Weiss | |
| 5,361,062 A | 11/1994 | Weiss et al. | |
| 5,479,512 A | 12/1995 | Weiss | |
| 5,485,519 A | 1/1996 | Weiss | |
| 5,491,752 A | 2/1996 | Kaufman et al. | |
| 5,557,518 A | 9/1996 | Rosen | |
| 5,590,197 A | 12/1996 | Chen et al. | |
| 5,657,388 A | 8/1997 | Weiss | |
| 5,715,314 A | 2/1998 | Payne et al. | |
| 5,742,684 A | 4/1998 | Labaton et al. | |
| 5,757,917 A | 5/1998 | Rose et al. | |
| 5,761,306 A | 6/1998 | Lewis | |
| 5,781,632 A | 7/1998 | Odom | |
| 5,790,667 A | 8/1998 | Omori et al. | |
| 5,790,677 A | 8/1998 | Fox et al. | |
| 5,809,144 A | 9/1998 | Sirbu et al. | |
| 5,815,665 A | 9/1998 | Teper et al. | |
| 5,825,881 A | 10/1998 | Colvin, Sr. | |
| 5,826,245 A | 10/1998 | Sandberg-Diment | |
| 5,887,065 A | 3/1999 | Audebert | |
| 5,909,492 A | 6/1999 | Payne et al. | |
| 5,937,068 A | 8/1999 | Audebert | |
| 5,956,699 A | 9/1999 | Wong et al. | |
| 5,988,497 A | 11/1999 | Wallace | |
| 5,991,411 A | 11/1999 | Kaufman et al. | |
| 5,991,413 A | 11/1999 | Arditti et al. | |
| 5,995,626 A | 11/1999 | Nishioka et al. | |
| 5,999,624 A | 12/1999 | Hopkins | |
| 6,005,939 A | 12/1999 | Fortenberry et al. | |
| 6,014,650 A | 1/2000 | Zampese | |
| 6,026,166 A | 2/2000 | LeBourgeois | |
| 6,029,141 A * | 2/2000 | Bezos et al. | 705/27 |
| 6,029,150 A | 2/2000 | Kravitz | |
| 6,035,406 A * | 3/2000 | Moussa et al. | 713/202 |
| 6,263,446 B1 * | 7/2001 | Kausik et al. | 726/5 |
| 6,418,467 B1 * | 7/2002 | Schweitzer et al. | 709/223 |
| 6,675,153 B1 * | 1/2004 | Cook et al. | 705/74 |
| 6,678,664 B1 * | 1/2004 | Ganesan | 705/39 |
| 6,747,561 B1 * | 6/2004 | Reeves | 340/573.1 |
| 6,754,181 B1 * | 6/2004 | Elliott et al. | 370/252 |

FOREIGN PATENT DOCUMENTS

| | | |
|---|---|---|
| WO | WO 93/04425 | 3/1993 |
| WO | WO 00 01108 A | 1/2000 |

OTHER PUBLICATIONS

Chaum, "Security Without Identification: Transaction Systems to Make Big Brother Obsolete," Association for Computing Machinery, New York, US, vol. 28, No. 10, Oct. 1, 1985, pp. 1030-1044.

Chaum, "Achieving Electronic Privacy," Scientific American Inc., New York, US. vol. 267, No. 2, Aug. 1, 1992, pp. 76-81.

* cited by examiner

CENTRALIZED IDENTITY AUTHENTICATION FOR ELECTRONIC COMMUNICATION NETWORKS

This application claims the benefit of U.S. Provisional Application Nos. 60/187,272; 60/187,341; and 60/187,271, all filed Mar. 6, 2000.

BACKGROUND OF THE INVENTION

The present invention relates to the art of Internet security and the authentication of otherwise unknown users or individuals. It finds particular application in conjunction with Internet based access/communication of confidential and/or personal records (e.g. medical records, financial records, governmental records, etc.), and will be described with particular reference thereto. However, it is to be appreciated that the present invention is also amenable to other like applications where it is desirable to positively identify the user or individual accessing the records to ensure that confidential and/or personal data is not improperly released to unauthorized requesters. For example, the invention is equally applicable to commercial transactions where it is desirable to positively identify the purchaser or good or services.

The Internet is an electronic communications network useful for transferring data or information. For example, many individuals or users find it advantageous to communicate, exchange data and/or conduct transactions with various entities, vendors, information providers and the like having a presence on the Internet, e.g., governmental and law enforcement agencies, law offices, hospitals, doctor offices, dental offices and other medical facilities, banks and financial institutions, credit card companies, insurance organizations, credit bureaus, pharmacies, retail stores, etc. For purposes herein, the foregoing will be referred to generally as vendors.

The various entities or vendors often maintain databases containing personal records of citizens, clients, patrons, patients, account holders, individuals or other like users associated with the entity or vendor. Accordingly, as the entities or vendors have a presence on the Internet and they maintain the respective databases of personal records, the Internet is a convenient vehicle for accessing and communicating personal data or information (e.g., governmental records, medical or dental records, pharmaceutical record, financial records, voting records, records of commercial transactions, legal records, insurance record, etc.) to an authorized requester.

However, the Internet is, to a significant degree, unsecure. Data or information transferred or accessed over an unsecure communications network is vulnerable to unauthorized capture and/or use. This is particularly troublesome when the data or information, such as that mentioned above, is personal and/or highly confidential in nature. Accordingly, Internet security directed to protecting confidential personal information from fraudulent or unauthorized access/communication is desired. For example, it is desirable to authenticate a user's identity prior to fulfilling a request for confidential information to ensure that the user is in fact authorized to access the information. Likewise, for commercial transactions, it is advantageous to authenticate a user's identity to ensure they are authorized to use the account from which payment is to be made.

Security has heretofore been limited in the foregoing area. For example, many entities or vendors have separate disparate security measures and/or authentication protocols. This is inconvenient and unduly repetitive for users which desire access to and/or confidential information from a plurality of distinct entities or vendors. A multitude of disparate protocols and security measures results in the users having to maintain numerous distinct passwords, IDs, electronic keys and/or other security software or devices, often, a different one for each entity or vendor. Moreover, some entities or vendors may use four character passwords which are capitalization sensitive while others may use eight character passwords which are capitalization independent. There is no standard authentication protocol among the various entities and vendors having a presence on the Internet. This makes keeping track of the various protocols and remembering the various security passwords and IDs even more difficult for users. Additionally, the various entities and vendors are each separately authenticating users' identities. This is unduly repetitive and inefficient, especially considering that the entity or vendors' core competency is not likely to include identity authentication.

The present invention contemplates a new and improved centralized authentication system and technique for carrying out transactions and granting access to personal information over a communications network that overcomes the above-referenced problems and others.

SUMMARY OF THE INVENTION

In accordance with one aspect of the present invention, a method of centralized identity authentication for use in connection with a communications network is provided. The method includes registering users of the communications network such that each registered user's identity is uniquely defined and determinable, and registering a plurality of vendors having a presence on the communications network. The registered vendors selectively transact with registered users, wherein the transactions include: (i) the registered vendor selling at least one of goods and services to the registered user; (ii) the registered vendor granting the registered user access to personal records maintained by the registered vendor; and/or (iii) the registered vendor communicating to the registered user personal information maintained by the registered vendor. The method also includes each user's identity being authenticated over the communications network prior to completion of transactions between registered vendors and registered users.

In accordance with a more limited aspect of the present invention, the method further includes communicating results of the authentication to at least one of the registered user and the registered vendor involved in the transaction.

In accordance with a more limited aspect of the present invention, the method further includes authorizing the completion of transactions between registered vendors and registered users.

In accordance with a more limited aspect of the present invention, the user's identity is withheld from the vendor.

In accordance with a more limited aspect of the present invention, the authentication is carried out using at least two-factor authentication.

In accordance with a more limited aspect of the present invention, the vendors are selected from a group consisting of governmental agencies, medical-records keepers, financial institutions, credit card companies, insurance organizations, credit bureaus, pharmaceutical concerns and retail concerns.

In accordance with a more limited aspect of the present invention, the method further includes notifying the registered user when a non-authentic user attempts to transact with a registered vendor posing as the registered user.

In accordance with a more limited aspect of the present invention, registering users includes obtaining personal data related to the users, and verifying the users' identities.

In accordance with a more limited aspect of the present invention, verifying the users' identities is accomplished by comparing for consistency the personal data obtained with corresponding personal data maintained by registered vendors.

In accordance with another aspect of the present invention, a centralized identity authentication system includes a computer connected to a communications network and means for registering users of the communications network such that each registered user's identity is uniquely defined and determinable. The system also includes means for registering a plurality of vendors having a presence on the communications network and a central database accessible by the computer. The central database contains accounts created by the registering means for each registered user and each registered vendor. The accounts include records of data collected by the registering means. Means for authenticating registered users' identities collect authentication data from users over the communication network and compare it to corresponding data from account records in the central database such that when there is a match the user providing the authentication data is deemed to be the registered user which holds the account.

In accordance with a more limited aspect of the present invention, the communications network is the Internet.

In accordance with a more limited aspect of the present invention, the vendors are selected from a group consisting of governmental agencies, medical-records keepers, financial institutions, credit card companies, insurance organizations, credit bureaus, pharmaceutical concerns and retail concerns.

In accordance with a more limited aspect of the present invention, the system also includes means for communicating results of the authentication to at least one of respective users and vendors involved in transactions with one another.

In accordance with a more limited aspect of the present invention, the system also includes means for notifying a true registered user of a failed authentication attempt carried out by the authentication means on an imposter.

One advantage of the present invention is that access to and communication of personal and/or confidential information is privately, securely and readily carried out.

Another advantage of the present invention is that users and vendors are protected from fraudulent or otherwise unauthorized access to confidential personal records.

Yet another advantage of the present invention is that the authentication efforts are not unduly duplicative.

Still another advantage of the present invention is that information from a plurality of distinct vendors is accessible using a single authentication vehicle thereby reducing the demands on users associated with having to support and maintain multiple authentication vehicles.

Still further advantages and benefits of the present invention will become apparent to those of ordinary skill in the art upon reading and understanding the following detailed description of the preferred embodiments.

BRIEF DESCRIPTION OF THE DRAWING(S)

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT(S)

Figure 1:
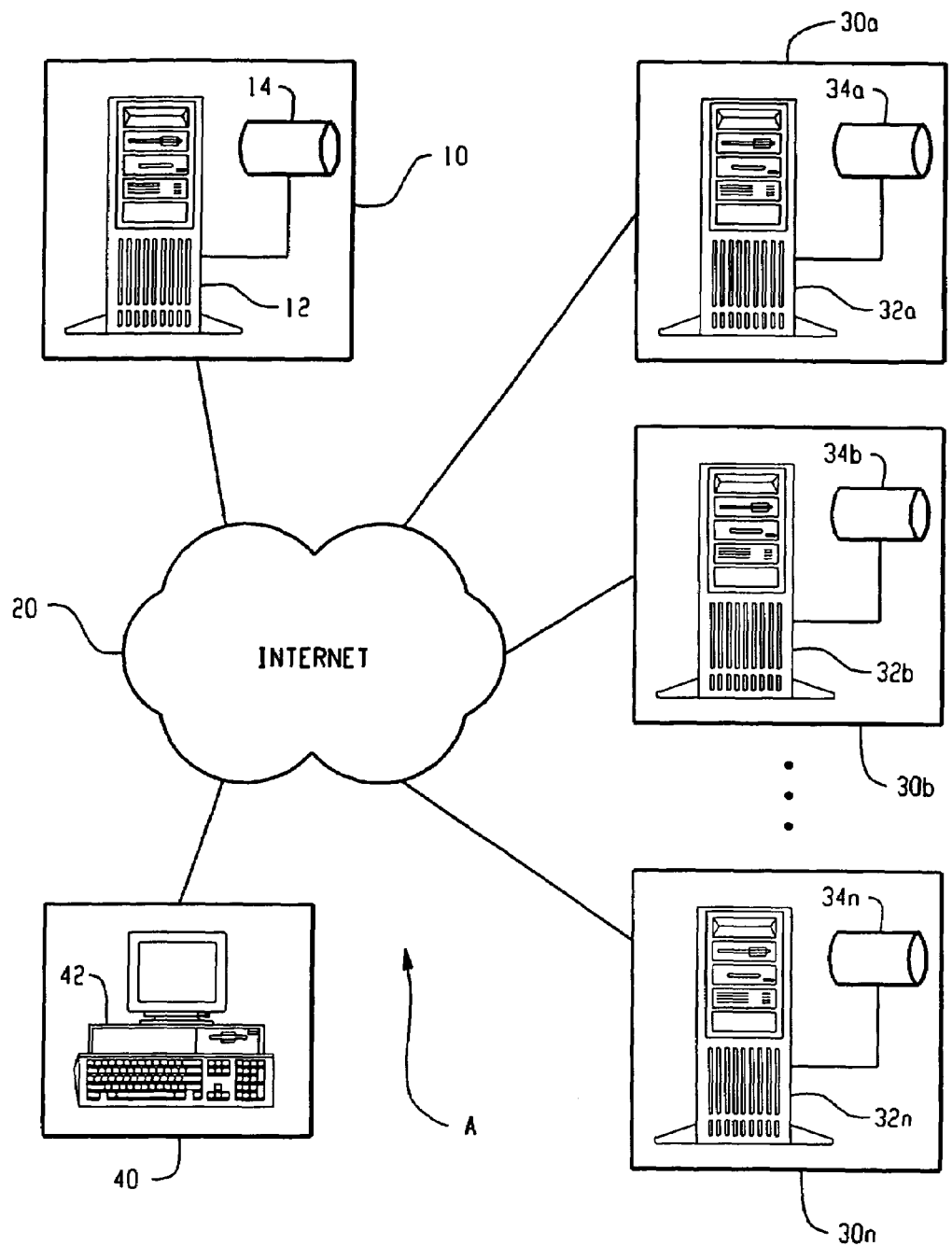
FIG. 1 is a block diagram showing a centralized authentication system in accordance with aspects of the present invention for use in connection with a communications network.

In accordance with aspects of a preferred embodiment of the present invention, FIG. 1 shows a centralized authentication system A including an authenticating agent 10 which maintains a presence on the Internet 20 or other like communications network via a server 12 or otherwise. A plurality of distinct vendors or entities 30$a$–$n$ also maintain a presence on the Internet 20 via servers 32$a$–$n$ or otherwise. The entities or vendors 30$a$–$n$ optionally include governmental or law enforcement agencies, law offices, hospitals, doctor offices, dental offices or other medical facilities, banks or financial institutions, credit card companies, insurance organizations, credit bureaus, pharmacies, retail stores, etc.

A user (individual, business or otherwise) 40 gains access to the Internet 20 using a computer 42 with an appropriate web browser or other like software running thereon. Of course, the centralized authentication system A is preferably administered to multiple similarly situated users 40. However, in the interest of simplicity herein, only one user 40 is shown in FIG. 1.

Each entity or vendor 30$a$–$n$ also optionally maintains a database 34$a$–$n$. The respective databases 34$a$–$n$ contain personal and/or confidential records, data or information related to citizens, clients, patrons, patients, account holders, or other users serviced by or otherwise associated with the entity or vendor 30$a$–$n$. As appropriate for the respective type of entity 30$a$–$n$, the data or information contained in the databases 34$a$–$n$ is optionally, medical or dental records, governmental records, voting data, law enforcement records, driving records, financial records, insurance records, legal records, credit records, commercial transaction data, pharmaceutical records, etc. for the users serviced by or otherwise associated with the respective entity.

While not explicitly proposed in every instance described herein, it is to be appreciated that security is further enhanced by optionally encrypting, with known encryption techniques, any or all of the communications relayed or otherwise transmitted over the Internet 20.

Figure 2:
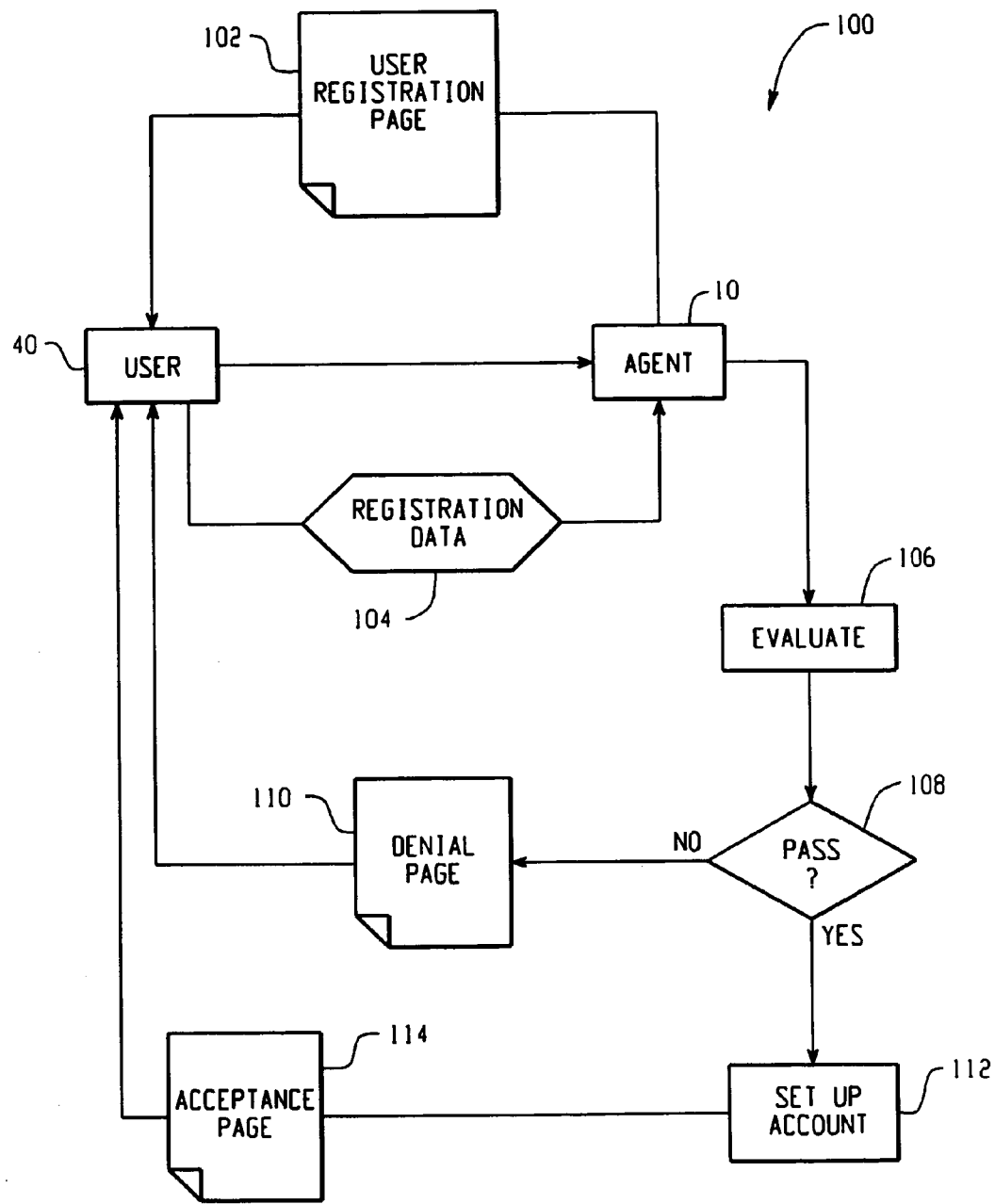
FIG. 2 is a block diagram showing a user registration process in accordance with aspects of the present invention.

With additional reference to FIG. 2, a user registration process 100 is administered by the authenticating agent 10. The user registration process 100 enables a user 40 to participate in and/or utilize the centralized authentication system A. User registration is carried out such that each user's identity is uniquely defined and determinable. Registration of a user 40 optionally begins with a visit by the user 40 to the authenticating agent 10. Preferably, over the Internet, the interested user 40, using an appropriate web browser, accesses a user registration page 102 which is made available via the agent's server 12. As the user registration process 100 continues, user registration data 104 (e.g., name, address, length at residence, own or rent residence, e-mail address, home phone number, work phone number, social security number, date of birth, mother's maiden name, employer, income, employment status, etc.) is collected or otherwise obtained by the agent 10 from the potential new user 40 who is making application for participation in the system A. Prior to accepting the new user 40, the user 40 is evaluated by the agent 10.

Preferably, the evaluation process 106 verifies the user's identity from the collected registration data 104 and determines the user's qualifications for participation, including optionally determining the user's credit worthiness. Optionally, the collected data 104 is used to verify the user's identity by determining its consistency with information made available from participating entities 30a–n, i.e., information from databases 34a–n. To retrieve the information from the entities 30a–n, the agent 10 preferably obtains consent from the user 40 to access the same when the registration data 104 is collected.

When the user 40 intends to conduct commercial transactions using the system A, the user's credit worthiness is preferably evaluated. In determining credit worthiness, the agent 10 optionally passes relevant user registration data to an appropriate financial institution or credit bureau where it is analyzed for credit worthiness. Alternately, the data is analyzed by the agent's own credit approval system. The analysis preferably includes the application of known credit approval techniques and algorithms which determine credit worthiness. Alternately, one or more, new or previously existing debit or credit accounts are set up based on the analysis and/or the financial data obtained.

Upon completion of the evaluation process 106, the agent 10 decides, at decision step 108, if the potential new user 40 has passed or failed the evaluation. If the user 40 has failed the evaluation, they are so notified, e.g., via an application denial page 110 being send to the user's computer 42 from the agent's server 12. Once the denial has been sent the registration process 100 ends. Alternately, the user 40 is given the option to change or correct the submitted registration data 104.

On the other hand, if the user 40 passes the evaluation, then an appropriate user account is opened 112 and the user 40 notified of the outcome, e.g., via an application accepted page 114 being sent to the user's computer 42. The acceptance page 114 preferably includes information related to the created account including, e.g., an account number or an assigned or selected user ID, a list of any limits or restriction placed on the account by the user 40 or agent 10, and/or other related data.

The created account and data or information related thereto is preferably maintained by the agent 10 in its database 14 along with the accounts for other registered users. In conjunction with the account creation, an authentication vehicle is set up for the user 40. The authentication vehicle is preferably two-factor authentication. However, authentication using more or less factors is contemplated depending on the level of security desired. In a preferred embodiment, the authentication vehicle is a dynamically changing password implemented via a hardware token issued to the user 40, a software object loaded on the user's computer 42 or some combination of both. Alternately, the dynamically changing password is generated by an algorithm which is synchronized to a clock or it is sequentially selected from a limited pre-generated list of random or quasi-random values. In still other contemplated embodiments, other secure authentication vehicles and/or techniques may be employed, e.g., challenge response, quick log mode, other one or more factor authentication methods such as a static username and password or pin number, smart cards, or biometric authentication such as fingerprint recognition and retinal scanners etc. To the varying degree desired, the selected authentication technique enables the agent 10 to positively identify registered users of the system A. Optionally, different types of authentication vehicles are employed for different users and/or vendors to accommodate their particular preferences.

In another preferred embodiment, the user 40 does not directly register with the agent 10. Rather, the registration data 104 is collected for the agent 10 by a trusted representative which in turn conveys it to the agent 10, optionally, in batch form. For example, the trusted representative may be a registered vendor 30 that independently signs up users 40 for the system A. In any event, the registration process may be essentially the same as shown in FIG. 2 with the trusted representative taking the place of the user 40.

Figure 3:
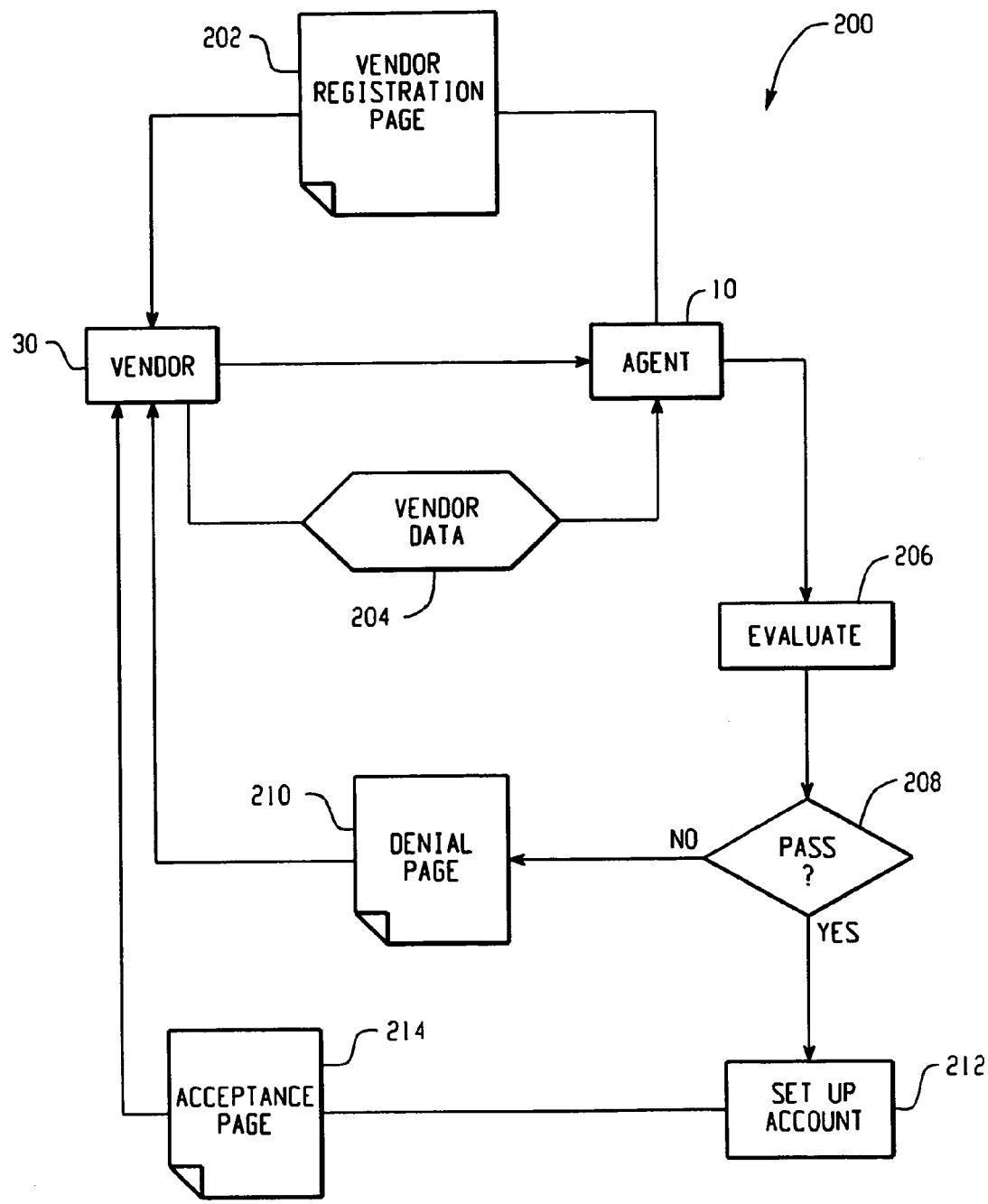
FIG. 3 is a block diagram showing a vendor registration process in accordance with aspects of the present invention.

With additional reference to FIG. 3, the entities or vendors 30a–n are also registered to participate in the system A. Preferably, the agent 10 administers the vendor registration process 200. The vendor registration process 200 is similar to the user registration process 100. It preferably is carried out online. In a preferred embodiment, via the server 12, the agent 10 provides an interested vendor 30 with a vendor registration page 202 which is used to capture or otherwise retrieve vendor data 204 (e.g., the vendor's name, place of business, type of business, Internet address, the type of records maintained in the vendor's database 34, the description or parameters of the vendor's database 34, a list of serviced users 40 and the parameters for each user's access to the vendor's database 34, etc.). At step 206, the vendor is evaluated to determine compatibility of the vendor's practices with the system A. For example, it is optionally determined if the vendor 30 maintains suitably reliable records of interest to users 40. Additionally, the vendor's general business practices may be evaluated and their participation denied to insulate users 40 from vendors 30 with poor customer relations/satisfaction or other potentially undesirable traits.

Upon completion of the evaluation process 206, the agent 10 decides, at decision step 208, if the potential new vendor 30 has passed or failed the evaluation. If the vendor 30 has failed the evaluation, they are so notified, e.g., via a vendor denial page 210 being sent to the vendor 30. Once the denial has been sent the registration process 200 ends. Alternately, the vendor 30 is given the option to change or correct the submitted registration data 204. On the other hand, if the vendor 30 passes the evaluation, then an appropriate vendor account is opened 212 and the vendor 30 notified of the outcome, e.g., via a vendor accepted page 214 being sent to the vendor. The acceptance page 214 preferably includes information related to the created account including, e.g., a vendor account number or an assigned or selected user ID, a list of any limits or restrictions placed on the account by the vendor 30 or agent 10, and/or other related data. The created vendor account along with any information or data related thereto is preferably maintained by the agent 10 in its database 14.

In the case of both users and vendors, if approved and participation is still desired, the user or vendor optionally supplies the agent 10, along with an indication of acceptance, additional account creation data. In the case of the user 40 the addition account creation data optionally includes, e.g., a secret personal identification number (PIN), the answers to a number of designated or otherwise selected security questions, designated limits or restrictions on the use of the account, etc. The security questions are preferably questions to which only the user 40 is likely to know the answers (e.g., the account holder's first car, the name of the account holder's dog or the like). The security questions preferably provide an added measure by which to positively identify the user 40 during authentication insomuch as only the true user of the account is likely to know the answers to the questions.

The accounts for users 40 may also contain information or data relating to account privileges. In a preferred embodiment, the user 40 has the option to customize or modify their account privileges. The account privileges are customized by the user 40, for example, by accessing the agent's server 12 over the Internet 20. For security purposes, the user 40 is optionally authenticated as an authorized user of the account, preferably, using the below described authentication procedure, prior to permitting any account modifications. However, at initial account creation, the below-described authentication procedure may not be employed. The account privileges are optionally set by the user 40 to limit the use of the account in the system A. That is to say, the set account privileges may restrict the account so that transactions thereon are not authorized for specified participating vendors 30*a–n*, so that automatically recurring transactions carried out absent the direct participation of the user 30 are not authorized, so that for commercial transactions purchases over a certain price limit are not authorized, and the like.

In the case of the vendor 30, once the vendor has accepted, the agent 10 forwards a participation kit to the vendor 30 enabling the vendor 30 to participate in the centralized authentication system A. Online, the kit is preferably forwarded via the Internet 20. The participation kit outlines the rights and responsibilities or duties of the vendor 30 with respect to their participation in system A. Optionally, the kit includes a participation agreement and a software object for installation on the vendor's server 32. After the vendor 30 signs the agreement physically, electronically or otherwise, it is returned to the agent 10, perhaps through the agent's server 12. Upon receipt of the signed agreement, the agent 10 maintains the agreement, vendor registration data, etc., in its database 14, optionally, accessible by both the agent 10 and the vendor 30.

The software object acts to interface the vendor's server 32 with the centralized authentication system A. Optionally, the software object is functional to recognize pre-authenticated users directed to the vendor's server 32 from the agent's server 12. In another embodiment, the software object automatically routes users directly accessing the vendor's server 32 to the agent 10 for authentication, preferably, on the agent's server 12.

Figure 4:
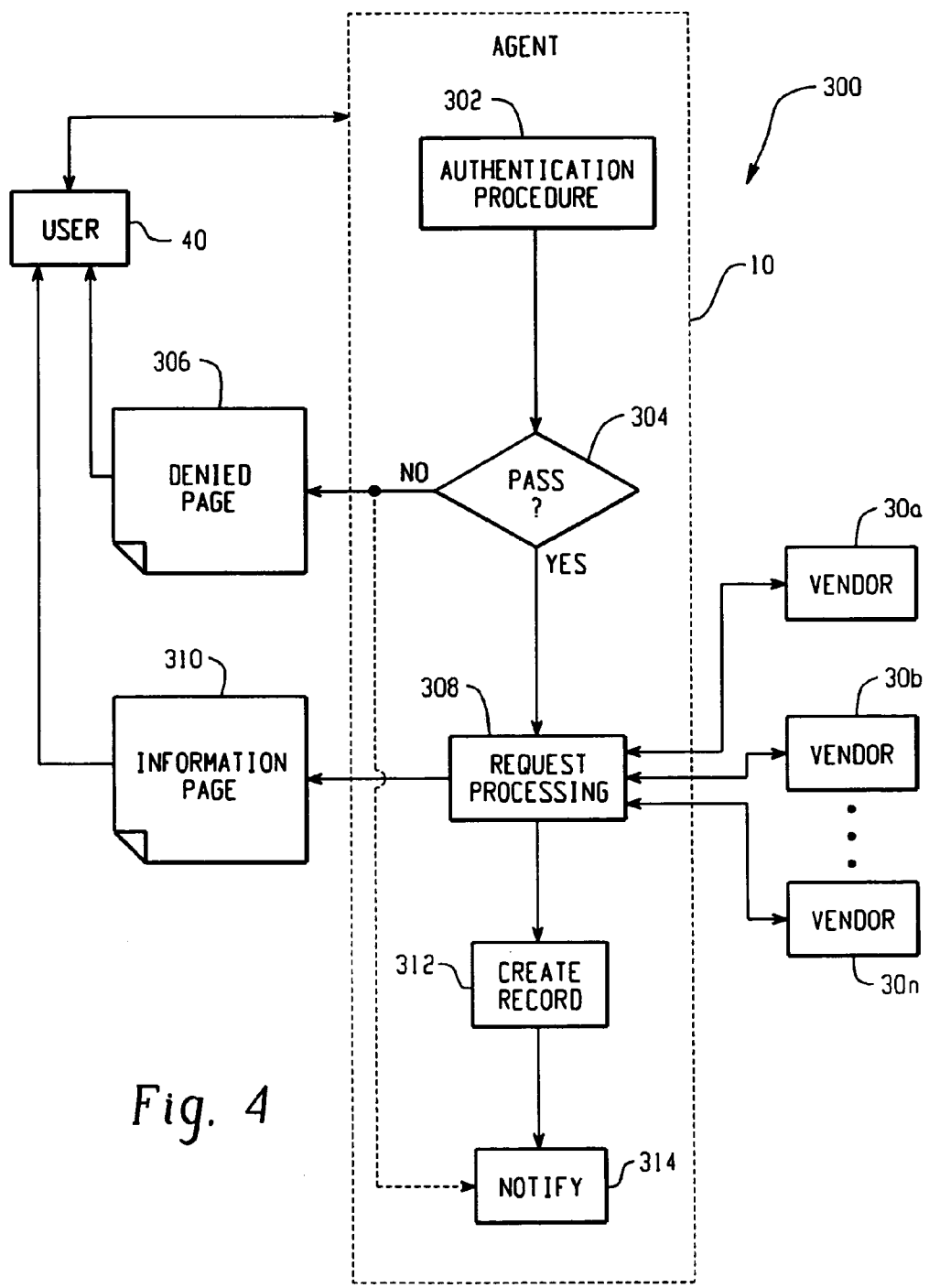
FIG. 4 is a block diagram showing an exemplary operation of the centralized authentication system of FIG. 1 in accordance with aspects of the present invention.

By way of example, FIG. 4 shows user 40 accessing personal and/or confidential information from one or more registered vendors 30*a–n*. An authenticated data access process 300 begins with a registered user 40 contacting the agent 10, preferably, over the Internet 20. The agent 10 conducts an authentication procedure 302 to positively identify the user 40, i.e., to ensure that the user 40 is registered and is in fact who he claims to be. The authentication procedure 302 preferably includes the agent 10 presenting an authentication page to the use 40. The authentication page is set up to collect authentication data from the user 40. Depending on the authentication vehicle set up for the user 40, the authentication data may include a user name or ID, a secret password, a dynamically changing password, a PIN, answers to security questions, biometric data, etc. The authentication data collected by the agent 10 is compared for consistency to the user account information maintained in the agent's database 14, and where there is a match, the user 40 is deemed authentic and positively identified as the holder of the matching account.

At decision step 304, it is determined if the user 40 has passed the authentication procedure 302. If the user 40 has not passed the authentication procedure 302, an access denied page 306 is returned to the user 40 informing him of his failure to be authenticated. Optionally, the access denied page 306 permits the user 40 to change and/or correct previously mis-entered authentication data and try again. The number of tries is, however, preferably limited.

On the other hand, if the user 40 passes the authentication procedure 302, the agent 10 administers a request processing procedure 308. The request processing procedure 308 retrieves the information or data requested by the user 40 from the respective vendors 30*a–n*, and forwards the same back to the user 40, e.g., via a requested information page 310. In another preferred embodiment, the pre-authenticated user 40 is redirected to the desired vendor's server 32*a–n* where the user's authenticated identity is recognized, e.g., via the software object installed thereon, and the vendor 30 and user 40 process information requests and/or carry out commercial transactions directly without further involvement of the agent 10.

In any event, as shown in FIG. 4, the request processing procedure 308 begins with the user 40 requesting, or the agent's server 12 otherwise displaying, a page with a directory listing registered vendors 30*a–n* that participate in the centralized authentication system A. The user 40 is then free to select the registered vendor or vendors of his choice from the directory. Optionally, the user 40 is prohibited from selecting those vendors for which the user 40 does not have authorized access. This may be the case when either the user's account or vendor's account has been selectively limited or restricted as indicated in the agent's database 14. That is to say, the user's account optionally lists those vendors which maintain personal and/or confidential data relating to the respective user. Accordingly, they would not have access to unlisted vendors. Moreover, the user 40 may expressly desire to prohibit access to certain vendors. On the vendor account side, the database 14 may list for each vendor 30*a–n* those users having information maintained in the vendors' respective databases 34*a–n*. Accordingly, unlisted users would not be granted access to the vendor. Moreover, certain vendors 30 may wish to expressly prohibit access by certain users 40.

After selecting a vendor 30, the agent 10 provides the user 40 with a information or data selection page from which the user 40 selects the information or data desired from the chosen vendor 30. Preferably, the data selection page lists only the information or data available from the selected vendor 30 as determined by the description of the vendor's database 34 which is retained in the agent's database 14. Upon completion of the data selection page, the agent 10 retrieves the requested information from the selected vendor 30 and forwards it to the user 40, e.g., via the requested information page 310. Note, the software object installed on the vendor's server 32 at the time of their registration optionally permits the agent's server 12 to interface therewith and retrieve the desired information.

In a preferred embodiment, the user 40 is permitted to make multiple information requests from various vendors prior to executing the retrieval and forwarding of the desired data. In this case, the user 40 proceeds and/or loops back through multiple vendor listing pages and/or data selection pages. As the user 40 proceeds, the individual information requests are collected and stored in a virtual shopping cart or the like. When desired, the user 40 proceeds to an execution page where the requests are processed in batch.

At step 312, once the request has been processed or simultaneously therewith, the agent 10 creates a record of the transaction and maintains the same in its database 14. The record is optionally stored with the respective user's account, the respective vendor's account or both. The transaction record preferably contains data related to the transaction such that the details of a particular transaction may be reviewed for tracking purposes if desired to determine what actions took place or the current status of a request's processing. For example, the transaction record optionally contains the identity of the user which requested the information, the vendor supplying the information, the information supplied, the date and time of the transaction, a unique transaction identifier or authorization number, etc. In this manner, transaction details are preserved such that any potential future discrepancies among the users 40, the vendors 30a–n and/or the agent 10, may readily be resolved.

In a preferred embodiment, the agent 10 also conducts an independent notification procedure 314 wherein participants in the transaction are independently notified of it. Preferably, independent confirmation that an information request has been received and/or that the processing of the same has been completed is sent to all the participants, i.e., the respective user 40 and vendor 30. Optionally, the notification is automatically forwarded to the respective e-mail addresses on file for the participants in the agent's database 14. The notification preferably includes the data from the generated transaction record.

Additionally, via the notification procedure 314, the agent 10 preferably independently notifies a registered user 40 when an authentication attempt fails. The failure notification is preferably forwarded to the e-mail address on file for the user in the agent's database 14. In this manner, a true user is made aware of an attempted unauthorized accessing of their personal and/or confidential records.

It is to be appreciated that while the foregoing discussion is primarily directed to users 40 obtaining desired information from various vendors 30a–n, the centralized authentication system A is equally applicable to users 40 providing or forwarding information to the various vendors 30a–n. That is to say, the user 40 may optionally access the vendors 30a–n through the centralized authentication system A in order to modify or update their respective records maintained in the vendors' databases 34a–n. The request processing procedure 308 merely works in reverse, i.e., it operates to retrieve updated data from the user 40 (e.g., via a data update page presented to the user 40 by the agent 10) and forward the updated data to the respective vendors 30a–n for storage in their databases 34a–n.

Figure 5:
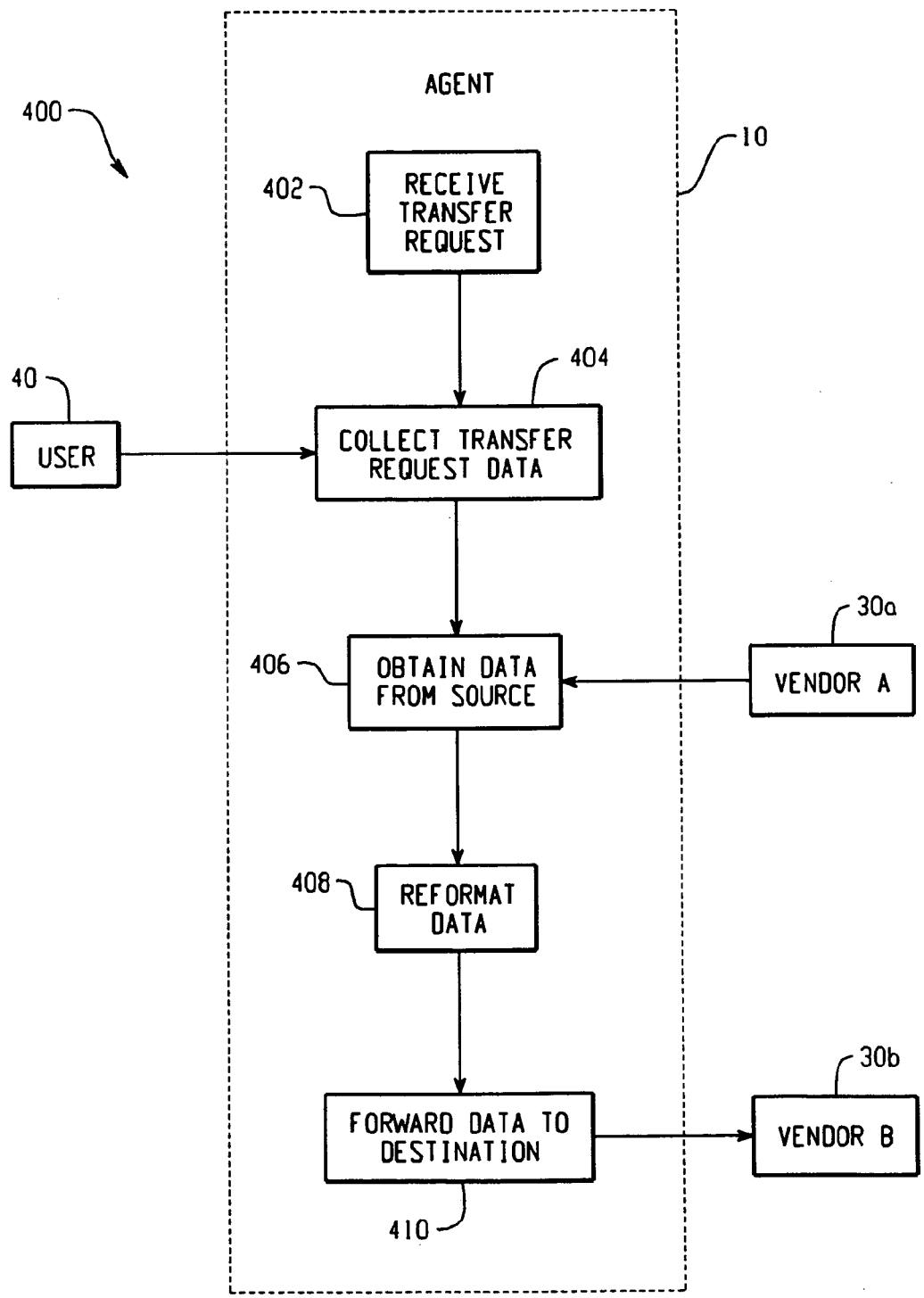
FIG. 5 is a block diagram showing an exemplary data transfer process between two vendors in accordance with aspects of the present invention.

On occasion, a user 40 may desire to have personal and/or confidential information maintained by one vendor (e.g., vendor 30a) communicated to another vendor (e.g., vendor 30b). Accordingly, the centralized authentication system A is, in a preferred embodiment, equipped to handle such occasions. For example, FIG. 5 shows, in block diagram form, a data transfer process 400 in accordance with aspects of the present invention, whereby a user 40 transfers, via the centralized authentication system A, personal and/or confidential information maintained by vendor 30a to vendor 30b. As shown in FIG. 5, the user 40 is presumed to have been authenticated, preferably, in the same or similar manner as described above with respect to FIG. 4. Having authenticated the user 40, the agent 10 receives, at step 402, a data transfer request, optionally, via a web page or the like provided to the user 40 by the agent 10 for requesting the same. Optionally, the data transfer request may be initiated by an object, link or the like existing on the provided directory page listing the registered vendors such that when the link or object is chosen by the user 40, the agent 10 begins the data transfer process 400.

At the next step 404, the agent 10 collects transfer request data from the user 40. Preferably, the transfer request data includes an identification of the source vendor, the destination vendor, and the information to be transferred. Of course, the only vendors and/or information that may be designated or selected by the user 40 are those for which the authenticated user 40 is authorized access as determined by the records/account information maintained in the agent's database 14. In accordance with the collected transfer request data provided by the user 40, at step 406, the agent 10 obtains the identified information or data from the identified source vendor, in this example, vendor 30a.

Optionally, the agent 10, at step 408, reformats or converts the obtained data from the source vendor 30a into a format compatible with or otherwise acceptable to the destination vendor, in this example, vendor 30b. That is to say, the database and/or format of information maintained by vendor 30a may not be the same as vendor 30b. For example, there may be different data fields with different names which may be arranged in different orders, or the data may be delineated differently, or the data may be encrypted or compressed differently. In any event, at step 408, the agent 10 reformats or converts the data so that it is accurately mapped or otherwise recorded into the appropriate location or corresponding data field in the destination vendor's database 34b. The agent 10 accomplishes the appropriate reformatting using the known information about or description of each vendor's database obtained in the vendor registration process 200.

After reformatting, at step 410, the agent 10 forwards the data to the destination vendor 30b as indicated by the user 40 in the collected transfer request data. While not shown, preferably, the data transfer process 400 is concluded with procedures akin to procedures 312 and 314 described above.

In a preferred embodiment, the users 40 and vendors 30a–n may selectively update and/or otherwise modify their accounts as desired. Various account options are preferably made available for them to exercise and their choices are maintained with their account information in the agent's database 14. Consequently, the agent 10 has the information with which to regulate access in accordance with the desires of the registered users and vendors.

For example, the registered users 40 or vendors 30a–n may selectively restrict or permit access to their information. Optionally, primary users 40 may designate other secondary registered users 40 which are authorized to access their personal and/or confidential information. Preferably, the extend of the authorization may be regulated by the primary user 40. For example, a secondary user 40 may be given only one-time access to retrieve information from a vendor's database 34 but be prohibited from updating or modifying information. Alternately, a secondary user 40 may be given unlimited access to selected vendors but no access to other vendors. In still another example, only particular information from a vendor may be restricted from access. Likewise, the vendors 30a–n may impose certain restriction or grant certain authorizations to designated users. In this manner, the centralized authentication system A may be custom fit to the desires of each participant.

Figure 6:
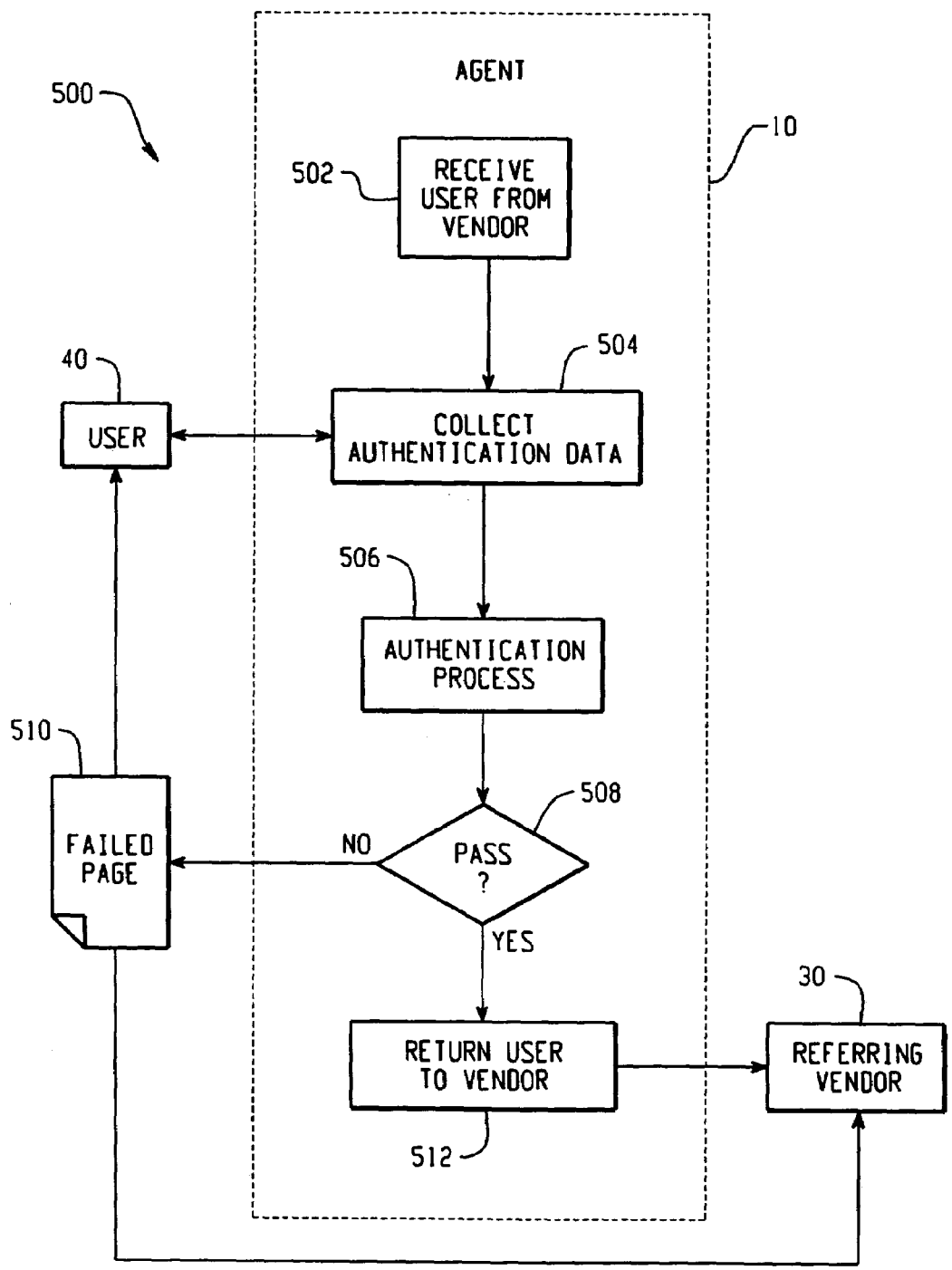
FIG. 6 is a block diagram showing an alternate exemplary operation of the centralized authentication system of FIG. 1 in accordance with aspects of the present invention.

With reference to FIG. 6, in another preferred embodiment of the present invention, the user 40 accesses a selected vendor 30 directly, e.g., over the Internet 20. Prior to completion of their interaction (i.e., before the delivery of requested information, granting of desired access or carrying out of selected commercial transactions), the authentication process 500 is administered. Completion of the vendor-user interaction is optionally initiated by the user 40 selecting or otherwise activating a link on a check-out or execution page provided by the vendor 30. The link is optionally associated with the software object installed on the vendor's server 32, i.e., the software object that came with the vendor's registration kit. The link and/or associated software object redirects the user 40 to the agent's server 12 for authentication and optional authorization.

At step 502, the agent 10 receives the redirected user 40 from the referring vendor 30. At step 504, authentication data is collected from the user 40. Preferably, the authentication data is collected via a data collection page provided to the user 40 by the agent 10. The data collection page is set up to collect authentication data from the user 40. Depending on the authentication vehicle set up for the user 40, the authentication data may include a user name or ID, a secret password, a dynamically changing password, a PIN, answers to security questions, biometric data, etc. After collecting the authentication data, the authentication process 506 is carried out. The authentication process 506 involves the agent 10 comparing for consistency the collected authentication data to the user account information maintained in the agent's database 14. Where there is a match, the user 40 is deemed authentic and positively identified as the holder of the matching account. The data collection step 504 and authentication process 506 collectively are essentially the same as the authentication process 302 described above.

At decision step 508, it is determined if the user 40 has passed the authentication process 506. If the user 40 has not passed the authentication process 506, an access denied page 510 is returned to the user 40 informing him of his failure to be authenticated. Optionally, the access denied page 306 permits the user 40 to change and/or correct previously mis-entered authentication data and try again. The number of tries is, however, preferably limited. Preferably, each denial is also reported to the referring vendor 30.

On the other hand, if the user 40 passes the authentication procedure 506, the agent 10, at step 512, returns the user 40 to the referring vendor 30 along with an indication of the user's authentication and/or identity. At that point, the vendor 30 and/or user 40 may interact as they see fit. Nevertheless, the vendor 30 is made aware of the user's authenticity and/or identity prior to completion of a commercial transaction, forwarding of, and/or granting access to, personal/confidential information, etc.

Optionally, the agent 10 also returns to the vendor 30 selected and/or requested authorization data. The authorization data optionally indicates a level of authorization set for the identified user 40. The level may have been set by the user 30 or vendor 40 upon registration or upon subsequent modification of the respective user and/or vendor accounts maintained by the agent 10. Alternately, the selected authorization data to be sent is predefined or individually requested when the user 40 is redirected to the agent 10 by the vendor 30. The indicated level returned to the vendor preferably informs the vendor 30 of the degree of access to be granted the user 40 to personal/confidential data maintained by the vendor 30, the dollar amount which the user 40 is authorized to spend in a given commercial transaction, etc. While not shown, preferably, the authentication process 500 is concluded with procedures akin to procedures 312 and 314 described above.

In one preferred embodiment, the user's identity is withheld from the vendor 30. In this manner, the users 40 maintain their privacy while the vendors 30 are assured by the agent 10 that the users 40 are authorized for the contemplated transaction or to access the information being requested. This privacy aspect is optionally implemented in any of the embodiments shown in the FIGURES where the agent 10 is responsible for both the authentication and optional authorization. By relying on the agent 10 to fulfill both these functions, the vendor 30 can carry out their end of a transaction or interaction without knowing the actual identity of the user 40. All the vendor 30 has to know is that the user 40 is in fact authentic and authorized to perform the selected function.

Preferably, the process and/or procedure carried out by the agent 10 as described above are implements via software, computer programs or like running on the agent's server 12, via hardware connected to the agent's server or via a combination thereof. Additionally, while described above with reference to the Internet 20, it will be appreciated by those of ordinary skill in the art, that other communications networks, local or wide area computer networks, cellular networks, hard wired networks, networks including point of sale terminals, etc., may also be employed as the means for communicating the data and/or information from one participant to another.

The invention has been described with reference to the preferred embodiments. Obviously, modifications and alterations will occur to others upon reading and understanding the proceeding detailed description. It is intended that the invention be construed as including all such modifications and alterations insofar as they come within the scope of the appended claims or the equivalents thereof.

Having thus described the preferred embodiments, the invention is now claimed to be:

1. A method of centralized identity authentication for use in connection with a communications network comprising:
   (a) registering users of the communications network with a centralized agent, each registered user being associated with authentication data from which that user can be authenticated;
   (b) registering with the centralized agent a plurality of different types of entities having a presence on the communications network, said plurality of different types of entities selectively engaging in a plurality of different types of transactions with registered users, said different types of entities and said different types of transactions including at least one of:
   (i) a first type of entity selectively engaging in a first type of transaction, wherein the first type of entity is a merchant and the first type of transaction includes selling at least one of goods and services to a registered user; and,
   (ii) a second type of entity selectively engaging in a second type of transaction, wherein the second type of entity is one that maintains personal records for registered users and the second type of transaction includes granting a registered user access to their personal records; and, (c) authenticating each user's identity over the communications network prior to completion of transactions between registered entities and registered users, wherein the registered users employ the same authentication data for both the first and second types of transactions.

2. The method according to claim 1, further comprising:
(d) communicating results of the authentication to at least one of the registered user and the registered entity involved in the transaction.

3. The method according to claim 1, further comprising:
(d) authorizing the completion of transactions between registered entities and registered users.

4. The method according to claim 3, wherein the user's identity is withheld from the entity.

5. The method according to claim 1, wherein the authentication is carried out using at least two-factor authentication.

6. The method according to claim 1, wherein the method further comprises notifying the registered user when a non-authentic user attempts to transact with a registered vendor posing as the registered user.

7. The method according to claim 1, wherein registering users comprises:
obtaining personal data related to the users; and,
verifying the users' identities.

8. The method according to claim 7, wherein verifying the users identities is accomplished by comparing for consistency the personal data obtained with corresponding personal data maintained by registered vendors.

9. The method of claim 1, wherein the authentication data includes a user id and password.

10. The method of claim 1, wherein the authentication data includes data corresponding to a biometric characteristic of the user.

11. The method of claim 1, further comprising:
transferring information in the personal records of an authenticated user maintained by one registered entity of the second type to another registered entity of the second type at the direction of the authenticated user, including reformatting the information so as to conform to a format in which personal records are maintained by the registered entity of the second type receiving the transferred information.

12. A centralized identity authentication system comprising:
a computer connected to a communications network;
means for registering user of the communications network, each registered user being associated with authentication data from which that user can be authenticated;
means for registering a plurality of different types of entities having a presence on the communications network, said different types of entities including at least:
a first type of entity selectively engaging in a first type of transaction, wherein the first type of entity is a merchant and the first type of transaction includes selling at least one of goods and services to a registered user; and,
a second type of entity selectively engaging in a second type of transaction, wherein the second type of entity is one that maintains personal records for registered users and the second type of transaction includes granting a registered user access to their personal records;
a central database accessible by the computer, said central database containing accounts created by the registering means for each registered user and each registered vendor, said accounts including records of data collected by the registering means; and,
means for authenticating registered users' identities, said authentication means collecting authentication data from users over the communication network and comparing it to corresponding data from account records in the central database such that when there is a match the user providing the authentication data is deemed to be the registered user which holds the account, wherein the registered users employ the same authentication data for both the first and second types of transactions.

13. The centralized authentication system according to claim 12, wherein the communications network is the Internet.

14. The centralized authentication system according to claim 12, further including means for communicating results of the authentication to at least one of respective users and vendors involved in transactions with one another.

15. The centralized authentication system according to claim 12, further including means for notifying a true registered user of a failed authentication attempt carried out by the authentication means on an imposter.

* * * * *